US010641296B2

(12) United States Patent
Gaertner

(10) Patent No.: US 10,641,296 B2
(45) Date of Patent: May 5, 2020

(54) ACCUMULATOR PISTON, IN PARTICULAR FOR A PRESSURE MEDIUM ACCUMULATOR OF A HYDRAULIC UNIT OF AN ELECTRONICALLY SLIP-CONTROLLABLE VEHICLE BRAKE SYSTEM

(71) Applicant: Robert Bosch GmbH, Stuttgart (DE)

(72) Inventor: Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 15/923,237

(22) Filed: Mar. 16, 2018

(65) Prior Publication Data
US 2018/0266443 A1   Sep. 20, 2018

(30) Foreign Application Priority Data

Mar. 16, 2017  (DE) .......................... 10 2017 204 454

(51) Int. Cl.
| | | |
|---|---|---|
| *F15B 1/24* | (2006.01) | |
| *F16J 1/00* | (2006.01) | |
| *F16J 15/3288* | (2016.01) | |
| *B60T 17/06* | (2006.01) | |
| *B60T 17/22* | (2006.01) | |

(52) U.S. Cl.
CPC .............. *F15B 1/24* (2013.01); *F16J 1/001* (2013.01); *F16J 15/3288* (2013.01); *B60T 17/06* (2013.01); *B60T 17/221* (2013.01); *F15B 2201/21* (2013.01); *F15B 2201/31* (2013.01); *F15B 2201/61* (2013.01); *F15B 2211/655* (2013.01)

(58) Field of Classification Search
CPC ............ F15B 1/24; F16J 1/001; F16J 15/3288

USPC ........................................................... 92/172
See application file for complete search history.

(56) References Cited

U.S. PATENT DOCUMENTS

| | | | | |
|---|---|---|---|---|
| 3,537,357 A | * | 11/1970 | Packer ...................... | F15B 1/24 138/30 |
| 4,577,663 A | * | 3/1986 | Andersen .................. | F15B 1/24 138/26 |

(Continued)

FOREIGN PATENT DOCUMENTS

| | | |
|---|---|---|
| CN | 101994598 A | 3/2011 |
| DE | 20 19 407 B2 | 7/1975 |

(Continued)

OTHER PUBLICATIONS

Parker (Parker Hannafin Corp. "Hydraulic Accumulator Products", e-brochure, 2003).*

*Primary Examiner* — Nathaniel E Wiehe
*Assistant Examiner* — Richard C Drake
(74) *Attorney, Agent, or Firm* — Maginot, Moore & Beck LLP

(57) ABSTRACT

An accumulator piston, in particular a piston for a pressure medium accumulator of a hydraulic unit of an electronically slip-controllable vehicle brake system, includes a cylindrical piston shaft, and a piston head covering the piston shaft. The piston head includes a circumferentially closed blind-hole-shaped recess having an opening. A cross section of the recess in a region of the opening has at least one smaller dimension than a cross section in a region of a base of the recess opposite the opening. The recess forms a mechanism configured to separate particles out from the pressure medium.

16 Claims, 1 Drawing Sheet

(56) References Cited

U.S. PATENT DOCUMENTS

| | | | | |
|---|---|---|---|---|
| 5,105,917 A * | 4/1992 | Sporzynski | ............ | B21D 53/34 |
| | | | | 188/370 |
| 5,231,916 A * | 8/1993 | Weiler | ................... | B21H 7/182 |
| | | | | 29/888.04 |
| 6,085,636 A * | 7/2000 | Ruckert | ................... | F16J 1/001 |
| | | | | 188/264 G |
| 6,612,339 B1 * | 9/2003 | Wilke | ..................... | B60T 8/368 |
| | | | | 138/30 |
| 6,637,317 B1 * | 10/2003 | Zeibig | ................. | B23P 15/10 |
| | | | | 92/129 |
| 8,037,810 B2 * | 10/2011 | Leidecker | ............... | B23P 15/10 |
| | | | | 29/888.04 |
| 9,541,099 B2 * | 1/2017 | Pekarsky | ................ | F15B 1/08 |
| 2006/0037471 A1 * | 2/2006 | Zhu | ...................... | F02F 3/0084 |
| | | | | 92/173 |
| 2006/0180418 A1 * | 8/2006 | Kojima | .................. | F15B 1/103 |
| | | | | 188/314 |
| 2012/0204714 A1 * | 8/2012 | Keller | .................... | B23P 15/10 |
| | | | | 92/260 |
| 2012/0266590 A1 * | 10/2012 | Janes | ....................... | F15B 1/14 |
| | | | | 60/413 |
| 2018/0320788 A1 * | 11/2018 | Winkler | ................... | F16J 1/001 |

FOREIGN PATENT DOCUMENTS

| | | |
|---|---|---|
| DE | 37 12 671 A1 | 10/1988 |
| DE | 101 35 544 A1 | 2/2003 |
| DE | 10 2006 006 789 B4 | 2/2008 |

* cited by examiner

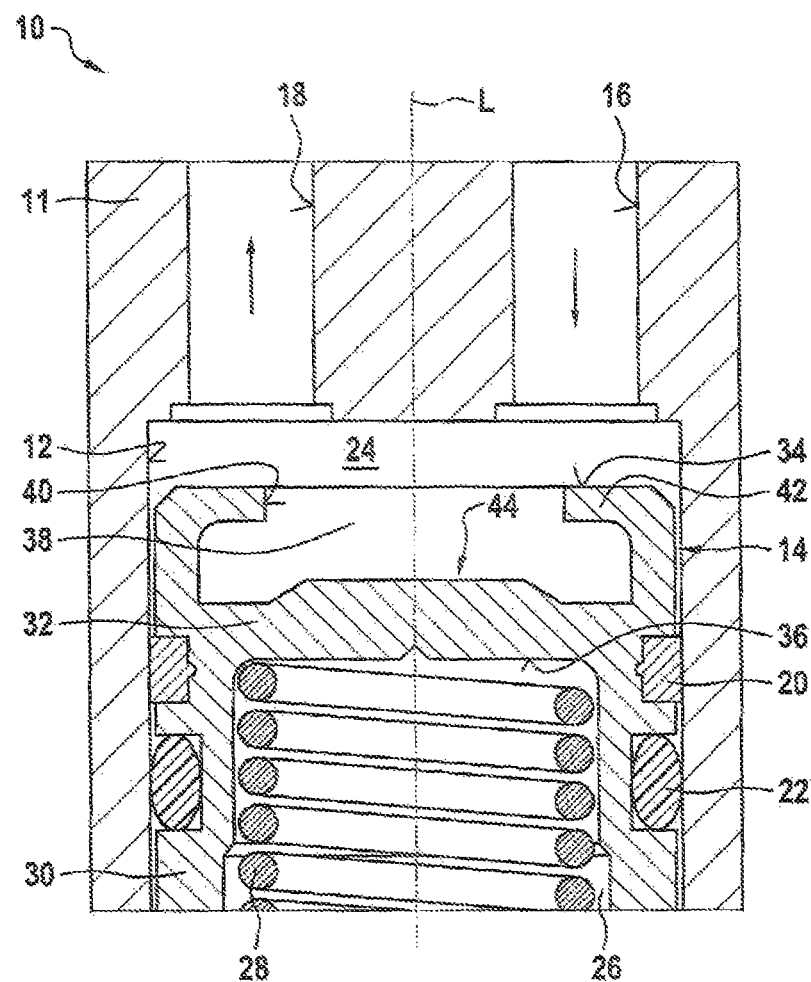

ACCUMULATOR PISTON, IN PARTICULAR FOR A PRESSURE MEDIUM ACCUMULATOR OF A HYDRAULIC UNIT OF AN ELECTRONICALLY SLIP-CONTROLLABLE VEHICLE BRAKE SYSTEM

This application claims priority under 35 U.S.C. § 119 to patent application no. DE 10 2017 204 454.3, filed on Mar. 16, 2017 in Germany, the disclosure of which is incorporated herein by reference in its entirety.

The disclosure relates to an accumulator piston, in particular for a pressure medium accumulator of a hydraulic unit of an electronically slip-controllable vehicle brake system.

BACKGROUND

An accumulator piston of this type is known for example from DE 101 35 544 A1. This known accumulator piston has a piston shaft which is designed as a hollow cylinder and via which the accumulator piston is displaceably received and axially guided in a cylinder. A piston head is formed at one end of this piston shaft. This piston head covers the open cross-section of the hollow cylindrical piston shaft and thereby forms an end face of the accumulator piston which faces the environment of the accumulator piston and can be acted upon by pressure medium.

Pressure medium accumulators which are constructed in this way are used in electronically slip-controllable vehicle brake systems in order to buffer pressure medium which has been discharged from wheel brakes in the course of a brake pressure control. They are connected upstream of pressure generators, which subsequently supply the buffered pressure medium to a brake circuit for further pressure build up or convey pressure medium volumes which are not required back to a supply container again after completion of a braking procedure.

Pressure medium can disadvantageously contain impurities. If these are particles with a high hardness, for example metal chips, these particles can damage sealing and/or guide rings arranged at the circumference of the accumulator piston. Furthermore, particles which penetrate into gaps between mutually relatively movable components block this relative movement and, in an extreme case, thereby trigger a system failure. The latter can also occur at components controlling the brake pressure, which are arranged downstream of the pressure medium accumulator or are supplied with pressure medium from the pressure medium accumulator.

SUMMARY

In contrast, a subject matter according to the features of this disclosure has the advantage that particles can be separated out of a contaminated pressure medium without requiring the use of separate filter devices for this. By saving on filter devices, there are fewer flow losses in a contacted pressure medium system and it is therefore possible to achieve a higher pressure medium flow rate or higher pressure build-up dynamics. The means on which the disclosure is based increase the robustness of the pressure medium system, do not require any additional part or assembly costs and can be realized economically.

According to the disclosure, the piston head of an accumulator piston is provided with a blind-hole-shaped recess having an opening at an end face of the piston head, wherein a cross-section of this recess has smaller dimensions in the region of the opening than at the base of the recess which is opposite the opening. In other words, the cross-section of the recess tapers in the direction of its opening or forms an undercut. The pressure medium flowing through the pressure medium accumulator is deflected by a recess designed according to the disclosure on its path through the pressure medium accumulator and, owing to the flow forces effective during this, is removed of particles contained in the pressure medium.

Further advantages or advantageous further developments of the disclosure are revealed in the claims, the FIGURE, and the description below.

A particularly effective separation of particles from the pressure medium can be achieved by a recess which is designed with a stepped cross-section and which has at least one shoulder which extends continuously in the circumferential direction and projects into the interior of the recess. A pressure medium flow to the recess is thus deflected a plurality of times at the base of the recess, at the transition to the circumferential wall of the recess, at the transition from this wall to the shoulder and finally at the transition from the shoulder to the opening, so that particles contained therein, as seen in the flow direction, collect in the region of the surrounding wall below the shoulder and particles which are already deposited there to not be entrained by the pressure medium flow.

The particle uptake volumes can be determined by the length of a spacing between the base and the shoulder of the recess, as seen in the longitudinal axis of the accumulator piston.

The flow guidance during the first deflection of pressure medium flowing into the pressure medium accumulator can be promoted by flow-directing means formed at the base of the recess. A preferred flow deflection here would be an abrupt flow deflection at a right angle, because it is thus possible to reduce the mechanical load on the accumulator piston and minimize undesired eddies in the flow.

An accumulator piston can be manufactured particularly economically if it is constructed as a single-piece component and/or is manufactured from plastics material. However, it would essentially also be possible to envisage an accumulator piston composed of a plurality of piston parts.

BRIEF DESCRIPTION OF THE DRAWINGS

An exemplary embodiment of the disclosure is illustrated in the FIGURE and is explained in detail in the description below. The single FIGURE shows a pressure medium accumulator having an accumulator piston designed according to the disclosure in a longitudinal section.

DETAILED DESCRIPTION

The pressure medium accumulator 10 shown in the FIGURE comprises an accumulator housing 11 having a cylindrical receiving means 12 formed therein for an accumulator piston 14. The receiving means 12 is formed in the manner of a blind hole and has a closed end located in the interior of the accumulator housing 11. At this closed end, two supply channels 16, 18, which extend parallel to one another by way of example, lead into the receiving means 12, wherein pressure medium flows to the pressure medium accumulator 10 through the one supply channel 16 and pressure medium flows out of the pressure medium accumulator 10 via the other supply channel 18.

In the receiving means 12, the accumulator piston 14 is axially displaceably guided in the direction of its longitudinal axis L. To this end, a guide ring 20 and a sealing ring 22 are arranged by way of example in a respective associated annular groove at the outer circumference of the accumulator piston 14. The accumulator piston 14 therefore separates a pressure medium chamber 24, which can be acted upon by pressure medium, with respect to a spring chamber 26 which is free of pressure medium. A restoring spring 28 is accommodated in the spring chamber 26, which restoring spring actuates the accumulator piston 14 in the direction for minimizing a volume of the pressure medium chamber 24. A helical spring serves by way of example as the restoring spring 28. This helical spring is supported at its end which is remote from the accumulator piston 14 in a manner which is not shown.

The accumulator piston 14 has a hollow cylindrical piston shaft 30, into the hollow interior of which the restoring spring 28 partially projects. The accumulator piston 14 furthermore has, at one end of the piston shaft 30, a piston head 32 which covers this piston shaft. This piston head closes the open cross-section of the piston shaft 30 and has an end face 34 facing the pressure medium chamber 24. The restoring spring 28 acts on a rear side 36, opposite the end face 34, of the piston head 32 by means of its second end.

According to the disclosure, a pocket-shaped or blind-hole-shaped recess 38 is present on the piston head 32. This recess 38 is circumferentially closed and has an opening 40 aligned towards the pressure medium chamber 24. The cross-section of the recess 38 is designed in such a way that the dimensions of the cross-section are smaller in the region of the opening 40 of the recess 38 than opposite this at the base of the recess 38.

The cross-section of the recess 38 is advantageously constructed in a stepped manner here. This is illustrated by way of example by a circumferential cylinder wall which extends axially from the base of the recess 38 and merges radially into a substantially radially aligned shoulder 42 at an axial spacing from the base of the recess 38. The opening 40 of the recess 38 is delimited by an inner circumference of the shoulder 42, wherein a transition from the shoulder 42 to the opening 40 of the recess 38 is constructed at a right angle in the exemplary embodiment.

A flow-directing device 44 is furthermore integrally formed at the base of the recess 38. This is located in the center of the base of the recess 38 and protrudes axially into the interior of the recess 38. A circumferential wall delimiting the flow-directing device 44 is conically chamfered so that the flow-directing device 44 tapers frustoconically towards the interior of the recess 38.

The explained accumulator piston 14 is a single-part component. Such a component can be manufactured particularly economically, in particular from plastics material, by injection molding. Deviating from this, however, an accumulator piston 14 according to the disclosure could also be composed of a plurality of piston components. A first piston component could preferably have the circumferentially closed recess 38 here, whilst a second piston component represents the piston shaft 30 and is fixedly connected to the first piston component. It is furthermore conceivable to manufacture the accumulator piston 14 or the piston components of an accumulator piston 14 from metal by injection molding, from metal sheet by shaping and/or by means of a machining procedure.

The described recess 38 in the piston head 32 of an accumulator piston 14 brings about that pressure medium flowing to the pressure medium accumulator strikes the flow-directing device 44 at the base of the recess 38 and is deflected radially outwards by said flow-directing device. The pressure medium flow is deflected a second time at the wall surrounding the recess 38, this time upwards in the FIGURE. From there, it arrives at the shoulder 42 which deflects the pressure medium flow radially inwards a further time until it finally passes through the opening 40 into the channel 18 conveying the pressure medium away.

The explained multiple deflection of the pressure medium flow on its path through the pressure medium accumulator 10 has the effect of radial forces which push particles contained in the pressure medium to the wall surrounding the recess 38. The particles are separated out of the pressure medium there, wherein in particular the shoulder 42 of the recess 38 prevents the particles from being entrained by the pressure medium flow. Pressure medium which is cleaned of particles flows accordingly out of the pressure medium accumulator 10 and the guidance of the accumulator piston 14 in the pressure medium accumulator 10, as well as the components controlling the pressure downstream of the pressure medium accumulator 10, are better protected from particle-related damage or premature wear.

It goes without saying that modifications or additions to the described exemplary embodiment are conceivable without deviating from the idea on which the disclosure is based.

What is claimed is:

1. An accumulator piston, comprising:
    a cylindrical piston shaft defining a longitudinal axis in a direction of movement of the piston; and
    a piston head covering the piston shaft, and including:
        an end face configured to be acted on by a pressure medium; and
        a blind-hole-shaped recess having an opening facing toward the end face, wherein:
            a first cross section of the recess in a region of the opening is smaller in at least one dimension than a second cross section of a base of the recess opposite the opening; and
            the recess has a stepped cross-section shape that forms at least one shoulder extending continuously in a circumferential direction of the accumulator and projecting radially into an interior of the recess, said shoulder being substantially radially aligned relative to the longitudinal axis.

2. The piston of claim 1, wherein the shoulder circumferentially delimits the opening, and is axially spaced apart from the base of the recess along a longitudinal axis of the piston.

3. The piston of claim 1, further comprising:
    a flow-directing device positioned on the piston so as to protrude into an interior of the recess, and configured to deflect pressure medium flowing into the recess radially outwards relative to the longitudinal axis.

4. The piston of claim 3, wherein the flow-directing device is integral with the base of the recess.

5. The piston of claim 1, wherein the piston is a single-part component.

6. The piston of claim 5, wherein the piston is an injection molded part formed from plastic material.

7. The piston of claim 1, wherein the piston is a piston for a pressure medium accumulator of a hydraulic unit of an electronically slip-controllable vehicle brake system.

8. A pressure medium accumulator, comprising:
    a housing including:
        a receiving chamber having a closed end; and
        at least one supply channel that enters the receiving chamber via the closed end;

an accumulator piston positioned in the receiving chamber so as to be axially displaceable, the accumulator piston including:
a piston shaft; and
a piston head covering the piston shaft; and having:
an internal recess
an end face facing toward the closed end of the receiving chamber, and including an opening that opens into the internal recess, wherein:
a diameter of the opening is smaller than a diameter of a base of the recess opposite the opening; and
the opening at least partially radially overlaps with the at least one supply channel such that engagement between the end face of the piston head and the closed end of the receiving chamber does not interrupt fluid communication between the at least one supply channel and the internal recess.

9. The pressure medium accumulator of claim 8, wherein the internal recess has a stepped cross-section shape that forms at least one shoulder extending continuously in a circumferential direction of the accumulator and projecting radially into an interior of the internal recess.

10. The piston of claim 9, wherein the shoulder circumferentially delimits the opening, and is axially spaced apart from the base of the recess along a longitudinal axis of the piston.

11. The piston of claim 9, wherein the shoulder is substantially radially aligned.

12. The piston of claim 8, wherein the piston head further includes a flow-directing device that protrudes into an interior of the recess, and that is configured to deflect pressure medium flowing into the recess radially outwards relative to a longitudinal axis of the piston.

13. The piston of claim 12, wherein the flow-directing device is integral with the base of the internal recess.

14. The piston of claim 8, wherein the piston is a single-part component.

15. The piston of claim 14, wherein the piston is an injection molded part formed from plastic material.

16. The piston of claim 8, wherein the pressure medium accumulator is a pressure medium accumulator of a hydraulic unit of an electronically slip-controllable vehicle brake system.

* * * * *